(12) United States Patent
Chowdhury (10) Patent No.: US 7,492,762 B2
(45) Date of Patent: Feb. 17, 2009

(54) METHOD FOR DYNAMIC FLOW MAPPING IN A WIRELESS NETWORK

(75) Inventor: Kuntal Chowdhury, Plano, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 918 days.

(21) Appl. No.: 10/405,418

(22) Filed: Mar. 31, 2003

(65) Prior Publication Data

US 2004/0047366 A1  Mar. 11, 2004

Related U.S. Application Data

(60) Provisional application No. 60/378,026, filed on May 13, 2002, provisional application No. 60/387,004, filed on Jun. 7, 2002.

(51) Int. Cl.
H04L 12/28 (2006.01)
H04L 12/56 (2006.01)
H04Q 7/00 (2006.01)
H04B 7/216 (2006.01)

(52) U.S. Cl. .................. 370/389; 370/329; 370/335; 370/342

(58) Field of Classification Search .................. 370/328, 370/329, 335, 342, 389, 392
See application file for complete search history.

(56) References Cited

U.S. PATENT DOCUMENTS

| | | | |
|---|---|---|---|
| 6,587,457 B1* | 7/2003 | Mikkonen | 370/356 |
| 6,754,188 B1* | 6/2004 | Garahi et al. | 370/328 |
| 7,136,382 B1* | 11/2006 | Sharma et al. | 370/392 |
| 7,174,179 B2* | 2/2007 | Krebs et al. | 455/504 |
| 7,245,627 B2* | 7/2007 | Goldenberg et al. | 370/419 |
| 2002/0120761 A1* | 8/2002 | Berg | 709/230 |
| 2003/0039259 A1* | 2/2003 | Madour | 370/401 |
| 2003/0117990 A1* | 6/2003 | Menzel et al. | 370/345 |
| 2003/0133408 A1* | 7/2003 | Cheng et al. | 370/230 |
| 2003/0179875 A1* | 9/2003 | Hsu et al. | 379/229 |

\* cited by examiner

*Primary Examiner*—Ronald Abelson
(74) *Attorney, Agent, or Firm*—Carr LLP (57) ABSTRACT

The present invention provides for mapping of plurality of IP flows to a plurality service instances. A plurality of IP flows are received at a PDSN. The header information associated with each IP flow at the PDSN is parsed. Each IP flow is mapped to its corresponding service instance. The mapping criteria are defined by a flow filter. The flow filter can be generated within the PDSN, or outside of the PDSN such as by an MS. Each IP flow is transmitted on its corresponding service instance to its endpoint, such as an MS.

20 Claims, 4 Drawing Sheets

Differing QoS for Service Instances

METHOD FOR DYNAMIC FLOW MAPPING IN A WIRELESS NETWORK

CROSS-REFERENCED APPLICATION

This application relates and claims priority from U.S. provisional patent application Ser. No. 60/378,026, filed May 13, 2002, entitled "Dynamic IP flow to Service Instance Mapping in the CDMA2000 IP Network," and further relates and claims priority from U.S. provisional patent application Ser. No. 60/387,004, filed Jun. 7, 2002, entitled "Dynamic IP Flow to Service Instance Mapping in the CDMA2000 IP Network," the contents of which are both incorporated by reference.

FIELD OF THE INVENTION

The present invention is generally directed to mapping IP flows to service instances in a CDMA environment and, more particularly, to dynamically mapping IP flows to a Generic Route Encapsulation keys within a Packet Data Service Node.

BACKGROUND

A 3GPP2 environment is one in which communication is generally directed to sending a data packet across a wireless media. In conventional systems, a mobile station (MS) attempts to initiate communication with a host computer (for example, a web server) using Internet protocol. In order to accomplish this, a service instance (basically, a virtual pipeline) can be set up from the MS to a router, such as a Packet Data Serving Node (PDSN). The MS can execute a plurality of service instances substantially concurrently. Each separate service instance, such as instances using file transfer protocol (FTP), voice over IP (VoIP) or Moving Picture Experts Group (MPEG) protocol, has one or more associated Quality of Service (QoS) characteristics, such as degree (if any) of acceptable packet loss, degree of packet delay, and so on.

However, there are problems associated with employing a plurality of service instances concurrently from the MS to the PDSN. One problem is that an MS could be running more than one application, wherein each application requires communication with separate hosts simultaneously. For instance, the MS could run FTP, VoIP, and MPEG, each ultimately with different hosts, and the MS could be receiving the IP flows associated with each application on different network addresses (IP addresses) and transport (TCP/UDP) ports. Moreover, each of these applications could require different QoS characteristics, and therefore could require its own service instance. For instance, FTP could tolerate delay, but not packet loss, and VoIP could tolerate some packet loss, but not delay. Each QoS characteristic would require its own service instance.

Therefore, a need exists for a method to setup and employ a plurality of service instances from an MS to a PDSN, each separate service instance having a separate "over the air" QoS requirement.

SUMMARY OF THE INVENTION

The present invention allows the MS to communicate through a PDSN using Internet Protocol (IP), wherein each flow of IP data from the MS to a host computer can have differing QoS characteristics. This is advantageous, in that flows can be selectively individually processed by the PDSN, thereby allowing flows with different QoS requirements to be individually treated and mapped. The present invention provides for mapping one of a plurality of IP flows within a PDSN to one of a plurality of GRE_keys, wherein each GRE_key further corresponds to its own service instance. A plurality of IP flows are received at a PDSN. The information associated with each IP flow at the PDSN is parsed. In one aspect, the information is header information. Each IP flow is mapped to its GRE_key within the PDSN, transmitted, and is then translated to its corresponding service instance identifier within a RAN, and from the RAN transmitted to the MS over the appropriate service instance.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION

Figure 1:
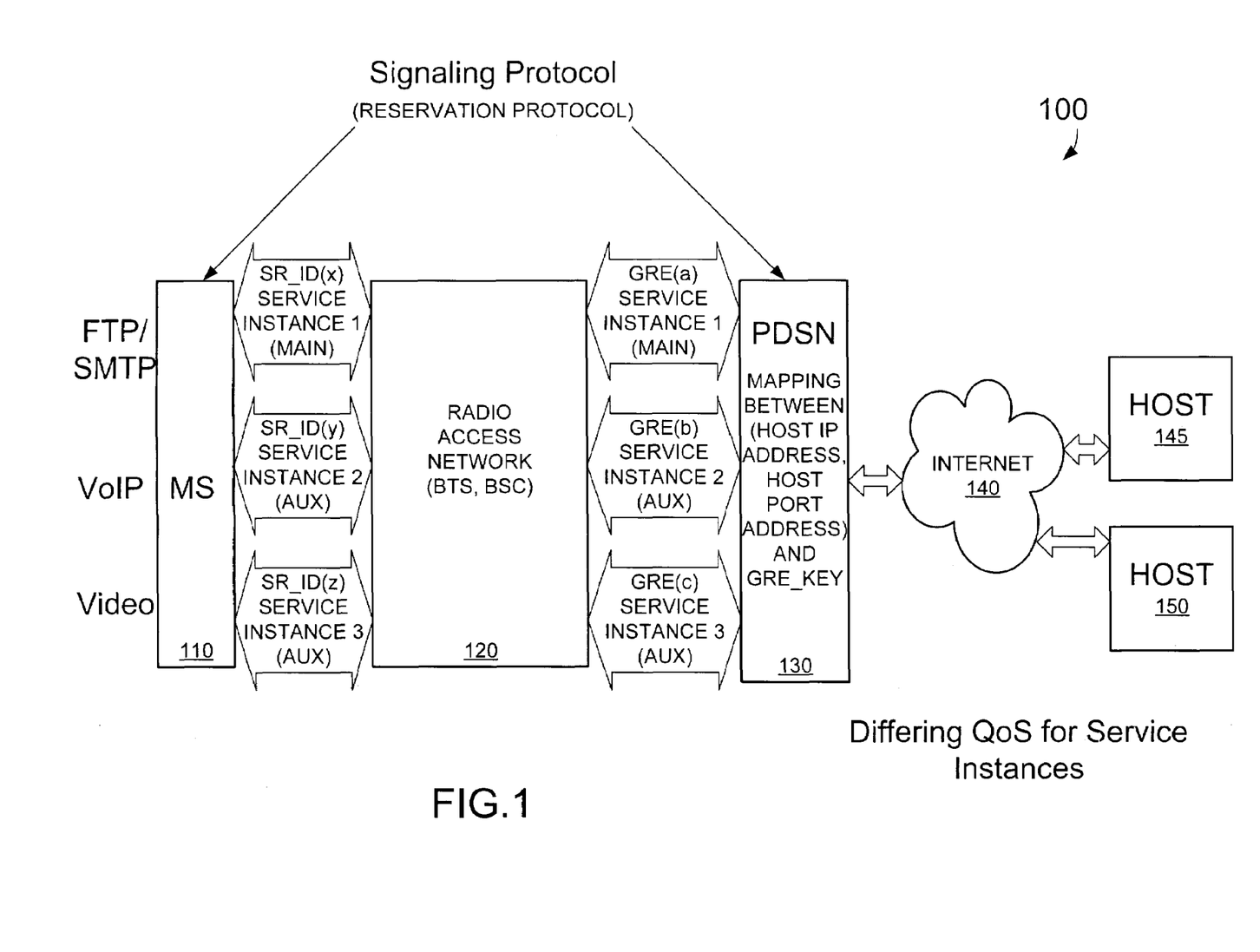
FIG. 1 is a block diagram illustrating a system comprising an MS, a RAN, a PDSN and plurality of host computers.

Turning now to FIG. 1, a system 100 for handling a plurality of service instances correlating to a plurality of separate QoS requirements is illustrated. In the following discussion, numerous specific details are set forth to provide a thorough understanding of the present invention. However, it will be understood by those skilled in the art that the present invention can be practiced by those skilled in the art following review of this description, without such specific details. In other instances, well-known elements have been illustrated in schematic or block diagram form in order not to obscure the present invention in unnecessary detail. Additionally, for the most part, details concerning CDMA systems and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, and/or integrated circuits that are coded to perform such functions.

FIG. 1 illustrates an MS 110. The MS 110 has a plurality of applications executing on it, each having its own QoS requirements for data transfer. In FIG. 1, these applications are FTP/SMTP, VoIP, and Video, such as MPEG, although those of skill in the art understand that other applications can also be used. A service instance can be generally defined as a virtual pathway between two communication ends that has a particular pathway and having particular QoS characteristics, and so on. Because each of these applications has its own QoS, each of these applications is segregated into its own service instance from the MS 110, and sent to a PDSN 130.

More particularly, each of these applications is connected over its own service instance to a radio access network (RAN) 120. Each service instance is identified by its own unique service reference identifier (SR_ID) value from the MS 110 to the RAN 120. Generally, the RAN 120 can have a base transceiver station (BTS), a base station controller (BSC), and so on. These instances are then terminated at the PDSN 130. Each service instance is identified by its own unique GRE (General Routing Encapsulation key) key value from the RAN 120 to the PDSN 130. A GRE_key can be generally employed as an identifier corresponding to the flow of packets from a source to a receiver. GRE employs encapsulation of one datagram encoded inside another datagram. Although, in FIG. 1, a correlation of SR_ID(x) to GRE_key(a) is illustrated, those of skill in the art understand that the correlation between the SR_ID and the GRE key need not be in order. In other words, SR_ID(z) could correspond to GRE(a), SD_ID (x) could correspond to GRE_key(b), and so on.

From the PDSN 130 to the respective hosts 145, 150 in the Internet 140, IP packets within each service instance are routed using conventional routing procedures. Similarly, each host 145, 150 can send IP packets to the MS 110 in their own IP flows. These packets are routed over the Internet 140 in a normal fashion to the PDSN (130). The PDSN 130 then maps the received IP flows onto separate service instances, denoted by GRE(a), GRE(b), GRE(c), and so on, to be sent to the MS 110. This header a function of information that is received in the header of the received flows, such as network layer header information and transport layer header information.

In the configuration of system 100, the MS 110 communicates to the PDSN 130 how many instances there are, and what are the criteria to map IP flows over each of them. Furthermore, the MS 110 can change these instances or attributes dynamically if such need arises. In FIG. 1, a signaling protocol, such as Resource Reservation Protocol (RSVP), is employed to signal between the MS 110 to the PDSN 130 to allow service instance one (the "main" instance) to "signal" to the PDSN 130 the information needed to configure the PDSN 130 to dynamically configure itself for the various auxiliary service instances. In other words, the necessary configuration information that is generated by the MS 110 and employed by the PDSN 130 is sent through RSVP protocol.

In FIG. 1, the PDSN 130 maps IP flows of applications from the hosts 145, 150 to appropriate service instances to support separate QoS requirements. This is based upon information supplied by the MS 110. Flow mapping can be generally defined as correlating an IP flow to a service instance, having a particular set of QoS parameters, within the PDSN 130. This occurs when the PDSN 130 receives an IP flow from one of the hosts 145, 150 and then maps that flow to its corresponding service instance.

In order to map IP flows from the hosts 145, 150, the PDSN 130 employs a set of parameters called a "filter." A filter is formed with use of the fields in the header of an Internet packet (IP and upper layers) datagram. Generally, in FIG. 1, the filter is signaled by the MS 110 to the PDSN 130 using RSVP signaling mechanism over the main service instance. The PDSN 130 processes or forwards the flows to the MS 110 accordingly, as a function of the information contained within the filter. Because of unique characteristics of IP flows, such as the combination of IP address of destination and source, transport port number of destination and source, and so on, the filters associated with IP flows can vary widely, and hence the IP flow mapping can vary widely. The flow mapping function of the PDSN 130 employs dynamic inputs to adjust to individual filters if the MS 110 indicates that QoS characteristics of a gives service instance have changed, or that a new service instance is to be installed, or that a service instance is to be deleted.

In FIG. 1, the MS 110 uses RSVP, extended with a 3GPP2_OBJECT, to initialize the PDSN 130 mapping function. The 3GPP2_OBJECT contains the required filter or filters for a particular service instance. A 3GPP2_OBJECT can be generally defined as a data structure having information pertinent to wireless data packet protocol for use with RSVP. However, those of skill in the art understand that in other signaling schemes, such as TCP/UDP over IP, the same information contained in the data structure of the 3GPP2_OBJECT can be carried in the specific fields, such as TCP/UDP over IP fields.

In FIG. 1, instance 1 is the main service instance and instances 2 and 3 are auxiliary service instances. In FIG. 1, an application in the MS 110, such as VoIP or Video, triggers the process for setting up an auxiliary service instance. This can occur because the MS 110 is to start transmitting packet data with different QoS characteristics than the packet data transmitted in the main service instance.

Typically, the physical and logic link layers of the MS 110 get a trigger from the upper layers through an implementation specific applications program interface (API) to setup the auxiliary service instance. At the time of the initiating of an auxiliary service instance, the main service instance is already established. The MS 110 and the hosts 145, 150 can negotiate the parameters to be used for the session (such as source, destination IP address and port numbers etc, and so on.) Because the session parameters (that is, the original setup) were negotiated, the MS 110 inserts some of the parameters received from the hosts 145, 150 into the 3GPP2_OBJECT, before sending the RSVP signal to the PDSN 130, which tells the PDSN 130 how to perform the mapping of the flows. The 3GPP2_OBJECT, however, is only an example of employment of the RSVP signaling protocol, and other signaling protocols are also allowed. A session can be generally defined as a series of interactions between two communication end points that occur during the span of one or more connections.

In FIG. 1, the MS 110 determines that an auxiliary service instance is to be used to support a new session, as opposed to running both sessions in the same service instance. When the MS 110 determines that an auxiliary path/service instance is to be set up, the MS 110 sends an RSVP message through the main instance to the PDSN 130. The message includes a 3GPP2_OBJECT. The 3GPP2_OBJECT in the message contains the packet filter components of the MS 110. Typically, these comprise the IP address of the receiver (that is, the MS 110) and the UDP/TCP port numbers that the application of the MS 110 has chosen for the session.

The following is an example of this object:

Class=(To be Assigned by the "Internet Assigned Numbers Authority" (IANA), generally, the version of IP or RSVP protocol, and so on)

Type=(To be Assigned by IANA; generally, a number that identifies the function of the RSVP or other message)

Reason Code: header information indicating why the object message was sent, such as setting up a new auxiliary instance, and so on.

TABLE 1

| 3GPP2_OBJECT Filter Information | | | |
|---|---|---|---|
| Type | Length | Filter_ID | SR_ID |
| Reason Code | Num of filters | Filter List Sub-Options. | |

Generally, the PDSN 130 can be set up to map an IP flow from the host 145, 150 to the MS 110, wherein the flows are separated at the PDSN 130 by their QoS characteristics as correlated to a GRE_key ID. Each GRE_key ID then correlates to a particular service instance. This mapping is installed at the PDSN 130 by a 3GPP2_OBJECT. The 3GPP2_OBJECT has several filters. Each filter allows the PDSN 130 to map an application flow to a particular service instance. The SR_ID denotes the ultimate SR_ID to which the service instance maps. The filter list sub options should contain the following five filters: (1) Source IP Address, (2) Destination IP Address, (3) Source Port, (4) Destination Port, and (5) Protocol ID. The Protocol ID is a field in the IPv4 header.

The PDSN 130, when receiving data from the hosts 145, 150, can analyze the header of these data packets to determine to which service instance the packet is to be mapped. This enables the PDSN 130 to interact with an MS 110 that is executing a plurality of applications, with at least two separate service instances set up between the PDSN 130 and the MS 110, one service instance per application. If the MS 110 determines that a new service instance is needed, the MS 110 can establish a further new auxiliary service instance and notify the PDSN 130 of the filter to be used to map flow(s) to this new auxiliary service instance through employment of the same RSVP message with yet another new 3GPP2_OBJECT. If the MS 110 determines that the characteristics of an on-going flow/session is about to change, then the MS 110 can send an RSVP message to the PDSN 130 with the 3GPP2_OBJECT that contains the required changes to an already-installed filter in the PDSN 130.

Furthermore, when routing VoIP traffic to the MS 110 from the hosts 145, 150, the PDSN 130 can strip off some information embedded in the header of the VoIP packet, thereby increasing the throughput and efficiency at which the VoIP packets can be transported over the air to the MS 110. This technique is called Header Compression (HC) or Header Removal (HR). When VoIP is in use, the MS 110 sends packets to the PDSN 130 without any IP and upper layer headers. The PDSN 130 then attaches, the missing information, that is, the IP and upper layer headers to the packets received from the MS 110, before forwarding the packet toward the hosts 145, 150. In order to do this function the PDSN 130 must have knowledge of the IP and upper layer fields that must be attached to the packets received from the MS 110 over a particular service instance. Therefore, the MS 110 must send the full details of the IP and upper layer header details (header fields) to the PDSN 130. To perform this task the MS 110 sends a RSVP signal to the PDSN 130 with a 3GPP2_OBJECT that contains the details about the IP and upper layer header fields for a specific flow. The set of parameters (header fields) used by the PDSN 130 to allow HR and HC operation may be generally termed as "Header Context". The 3GPP2_OBJECT defined in this invention can be used to signal "Header Context" as illustrated above.

Figure 2:
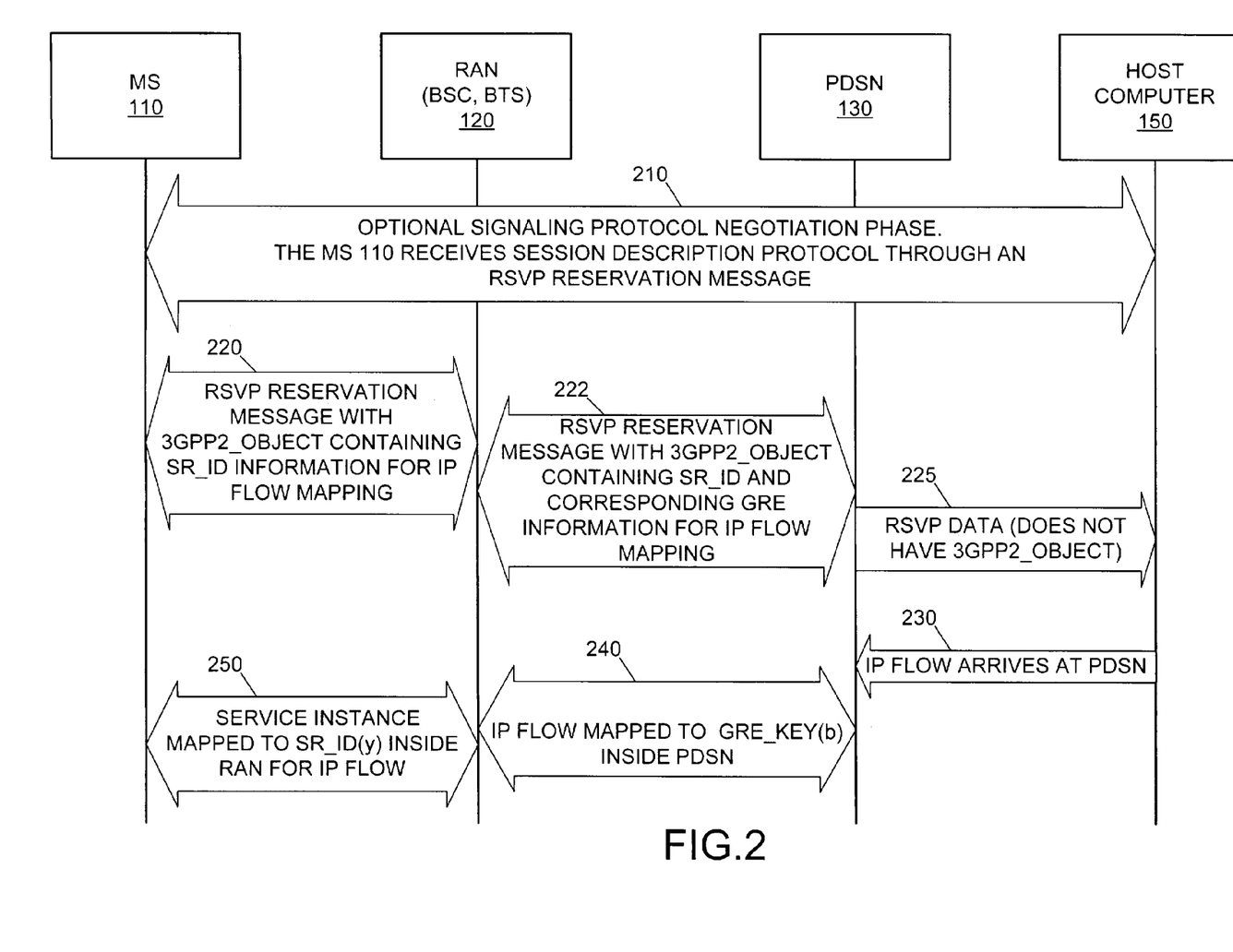
FIG. 2 is a Nodal Analysis diagram illustrating the installation and employment of a mapping object, through employment of a signaling protocol, in the PDSN of FIG. 1.

Turning now to FIG. 2, illustrated is a node diagram of the generation and employment of a filter, such as found within a 3GPP2_OBJECT, in the system 100. This step can, for instance, be used by applications such as VoIP to initiate the VoIP session. In this step, the MS 110 and the host computer 150 exchange set-up information, such as MS 110 and host computer 150 IP addresses, port address, and so on.

In flow 220, the host computer 150 and the MS 110 exchange RSVP messages. In this flow, the RSVP message that was issued by the MS 110 is illustrated. The PATH message contains the IP flow filter ("flow filter"), such those within a 3GPP2_OBJECT. This flow filter contains the SR_ID, which corresponds to the service instance to which a given IP flow is to be mapped. In flow 222, the RAN 120 matches the SR_ID with a corresponding GRE_key, and forwards this flow filter to the PDSN 130, as well as the corresponding GRE_key. The PDSN 130 extracts the flow filter from the RSVP PATH and installs the flow filters contained in the 3GPP2_OBJECT within the PDSN 130, thereby determining both the SR_ID and its corresponding GRE_key for the given mapped service instance. The PDSN 130 also removes the filter object from the PATH message. RSVP data, (without the 3GPP2_OBJECT) is forwarded towards the host computer 150 over an RSVP PATH in flow 225. The processing of the RSVP PATH and subsequent RESV messages are understood by those of skill in the art.

In flow 230, the bearer flow, that is, the IP flow having packet payload data to be used by the MS 110, arrives at the PDSN 130 from the host 150. In flow 240, the IP flow is mapped onto the installed filter from the 3GPP2_OBJECT within the PDSN 130. This is generally performed by determining to which GRE_key the SR_ID corresponds, and then sending the IP flow down the appropriate GRE tunnel corresponding to the GRE_key. In flow 250, the GRE_key is removed, and the mapped IP flow is sent to the MS 110 over the corresponding Generally, the IP flow is mapped by the PDSN 130 to either the main or auxiliary instances of FIG. 1 as a function of the filters extracted from the 3GPP2_OBJECT. At this intermediate destination, such as the PDSN 130, the datagrams are de-encapsulated and then routed to the next leg. In FIG. 2, the GRE_key generally corresponds to the header information within the IP header packet that enables the PDSN 130 to forward the flow to the correct IP address. The IP address can correspond to one of a plurality of MS 110s, each with its own IP address.

Figure 3:
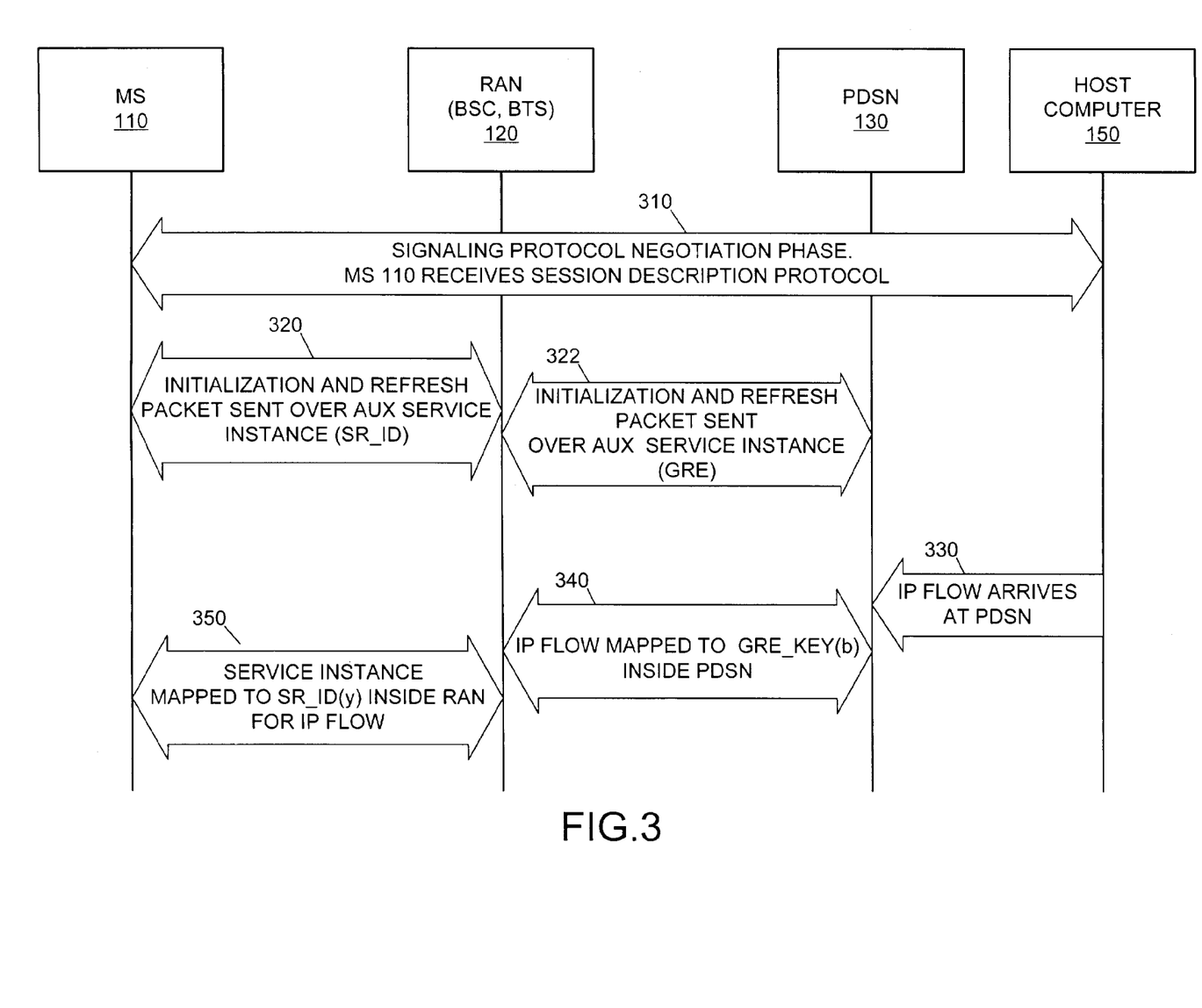
FIG. 3 is a Nodal Analysis diagram illustrating the generation and employment of an initialization and refresh (IR) packet to enable the flow mapping in the PDSN of FIG. 1.

Turning now to FIG. 3, disclosed is a nodal analysis diagram 300 employing implicit signaling with a Header Compression Context initialization phase. Employment of ROHC is an alternative way of configuring the PDSN 110 to map flows to service instances.

Generally, ROHC establishes a mathematical function or correspondence from a first sequence number (such as a header field in a datagram) to other fields in the IP packet or other fields in the datagram. Then, this number, with the mathematical derivations, are communicated to the PDSN 130. Whenever another field changes, such as source port number, destination IP address, and so on, additional information, such as additional IP/UDP/RTP fields in an ROHC context update message, is sent to the PDSN 130 to update the corresponding header information. Header compression is possible due to the fact that there can me much redundancy between header field values within packets, but especially between consecutive packets. Header compression can be very useful in wireless communication, as it can increase the bandwidth available to bearer traffic.

A context initialization/sequence number packet, when setting up ROHC at the very beginning of a point to point transfer of data, contains messages carrying or otherwise identifying all the header fields. In flow 310, the MS 110 initializes the context in the PDSN 130 for the reverse direction traffic (from the MS 110 to the PDSN 130) and the PDSN 130 initializes the context in the MS 110 for the forward direction traffic (from the PDSN 130 to the MS 110). The Internet Protocol (IP)/user datagram protocol (UDP)/real time transport protocol (RTP) header compression scheme of FIG. 3 generally performs context initialization at the onset. The embodiment of FIG. 3 can be used among a plurality of compressed IP flows.

Generally, the mapping functionality within the PDSN 130 depends on the knowledge of the PDSN 130 concerning the filters employed on data in the forward direction. Because the PDSN 130 sends updates to the MS 110 to initialize the header compression context of the MS 110. Generally the PDSN 130 has most of the information in the forward direction at the time it receives the very first packet on the forward direction from the host 150 to the MS 110.

However, after flow 310, the PDSN 130 still lacks binding information, the information that correlates an IP flow having a particular QoS to a service instance, such as the main service instance or the various auxiliary service instances. This relationship would be a relationship set up between the flow IP and the SR_ID and GRE_key by the flow filter.

In step 320, in order to discover that information, the PDSN 130 can use the information in the full header updates that it receives on the reverse direction over a service instance identified by SR_ID as an Information Refresh (IR). For ease of illustration, the IR packet on the forward direction is not shown in FIG. 3. The source IP address of the full header updates from the MS 110 contain the destination IP address in the filter list and is conveyed to the RAN 120. From the RAN 120, the SR_ID, full header updates and the corresponding GRE are sent to the PDSN 130 through employment of the IR packet in flow 322. The PDSN 130 performs the binding through the extraction of the mapping information.

In flow 330, the bearer IP flow arrives at the PDSN 130 from the host 150. The IP flow of the application is mapped onto the installed filter. In flow 340, the flow is mapped from the PDSN 130 GRE_key(b) in the RAN 120. In the flow 350, the RAN 120 maps to the SR_ID(y), and the flow is forwarded to the MS 110.

In a further embodiment, if, for some reason, the IR packet is sent to the PDSN 130 out of band, that is, not sent over the selected auxiliary service instance, then the IR packet can be modified to include the SR_ID of the selected auxiliary service instance.

Figure 4:
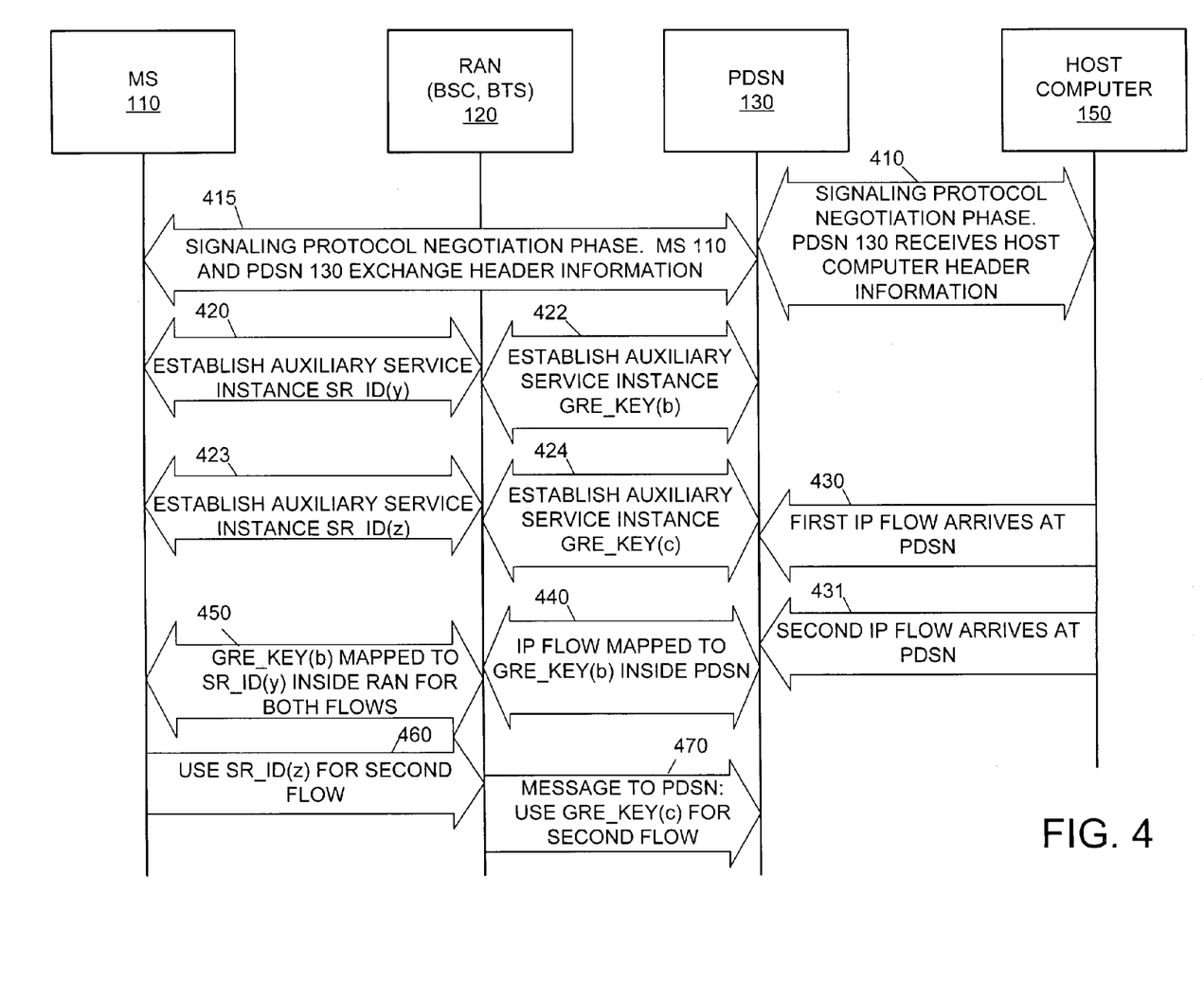
FIG. 4 is a Nodal Analysis diagram illustrating the generation and employment of mapping information within both the MS and the PDSN of FIG. 1.

Turning now to FIG. 4, disclosed is Nodal Analysis diagram illustrating the generation and employment of mapping information within both the MS 110 and the PDSN 130 of FIG. 1. In FIG. 4, in flows 410 and 415, the MS 110 and the PDSN 130 exchange information employable to help determine the GRE to SR_ID mapping information on their own.

Generating the mapping information is analogous to a self-healing network after a catastrophic failure. The IP flow mapping to the various appropriate service instances relates to a form of forwarding function that routers perform. The routers create a forwarding table based on the routing information exchanged by routing protocols like Open Shortest Path First (OSPF), Intermediate System-to-Intermediate System (IS-IS), Border Gateway Protocol (BGP), and so on. The concept of flow mapping is also based on such a forwarding table. One basic structure of a forwarding table can be as follows:

TABLE 2

Basic Structure of Forwarding Table

| Input Interface | Destination Address Prefix | Output Interface |
|---|---|---|
| 1 | 176.68 | 0 |
| 1 | 120.55 | 0 |
| ... | ... | ... |

The PDSN 130, as the egress/ingress router for the MS 110, in flows 410 and 415 creates such a forwarding table. For multiple service instance support, however, the forwarding table further employs further information, such as a service instance identifier, SR_ID and GRE key.

The SR_ID that the MS 110 chooses to use uniquely identifies the service instance and is forwarded in flows 420 and 422. The SR_IDs, and their corresponding GRE keys, are forwarded from the RAN 120 to the PDSN 130 in the flows 422, 424. The PDSN 130 has knowledge of the SR_ID and the GRE_ID when the service instances are established. The following table is an illustration of an expanded forwarding table that is established.

TABLE 3

Expanded Forwarding Table to Allow for Service Instances

| Input Interface | Source (MS) Address Prefix | Source (MS) Port | Destination Address Prefix | Output Interface | SR_ID | GRE Key ID |
|---|---|---|---|---|---|---|
| 1 | * | * | 176.68 | 0 | 1 | xxxx |
| 1 | | | 176.68 | 0 | 2 | yyyy |
| 1 | | | 176.68 | 0 | 3 | zzzz |
| 1 | * | * | 120.55 | 0 | 1 | aaaa |
| 1 | | | 120.55 | 0 | 2 | bbbb |
| ... | ... | ... | ... | ... | ... | ... |

However, Table 3 does not provide complete forwarding information to the PDSN 130 to enable the mapping of IP flows from the host 150 to the MS 110. The input interface, the physical interface that the device uses to receive packets, and the destination IP address prefix of the received packet are not sufficient to make a forwarding decision. In Table 3, The Source Address Prefix and the Source Port fields are not populated.

Therefore, the IP flow to a service instance association is derived at the MS 110. The MS 110 uses a function $f(x)$ to derive the SR_ID to be used for the auxiliary service instance. The input to the function should be at a minimum the MS 110 IP address, the host computer 150 IP address and the Port Number of the host computer 150. The MS 110 then establishes the auxiliary service instance with the derived SR_ID in flows 420 and 423. If the derived SR_ID is already in use, the MS chooses to use the next available SR_ID. This is communicated to the PDSN 130 in flows 422, 424 from flows 420, 423 respectively.

When the flow 422, 424 arrive at the PDSN 130, the PDSN 130 then has knowledge that an auxiliary service instance is established for the MS 110 to convey a particular IP flow from the host 150. The PDSN 130 also implements the same standard function $f(x)$ and the input to the function is the Destination IP address, Source IP address and the Source Port number, which were transmitted to the PDSN 430 from the MS 110 in flows 422, 424.

All of these fields can be dynamically parsed from the packet header of the flow in IP flows 430, 431, and the SR_ID value calculated in the PDSN 130. If the derived value matches the SR_ID in the forwarding table, then the PDSN 130 sends the packet down through the service instance.

The function $f(x)$ and the inputs to this function are coordinated so that both the PDSN 130 and the MS 110 can derive the same SR_ID using the same function and inputs. In other words, the PDSN 130 and the MS 110 determine to which service instance a flow is to be mapped. The choice for the function can be Modulo 7 of (XoR(x)) or Modulo 7 of (CRC (x)), and so on. These functions can be implemented in the hardware, therefore they execute extremely fast. After deriving the SR_ID, the PDSN 130 checks whether its forwarding table has the Source Address Prefix and Source Port number fields for the SR_ID for a given corresponding Destination Address Prefix in the MS 110. If these two fields (the Source Address Prefix and the Source Port number, derived for a given IP flow 430, 431 flow) are empty, then the PDSN 130 populates these fields accordingly, and subsequently the PDSN 130 then correlates the SR_ID value and the port and destination address values, instead of calculating it. A partially populated forwarding table can look like the one below:

TABLE 4

Population of Fields in Destination Address

| Input Interface | Source Address Prefix | Source Port | Destination Address Prefix | Output Interface | SR_ID | GRE Key ID |
|---|---|---|---|---|---|---|
| 1 | * |  | 176.68 | 0 | 1 | xxxx |
| 1 | 133.41 | 8080 | 176.68 | 0 | 2 | yyyy |
| 1 |  |  | 176.68 | 0 | 3 | zzzz |
| 1 | * | * | 120.55 | 0 | 1 | aaaa |
| 1 |  |  | 120.55 | 0 | 2 | bbbb |
| ... | ... | ... | ... | ... | ... | ... |

Table 4 forwarding table illustrates the case for MS 110 Destination Address Prefix 176.68, which is receiving a flow from the Source Address Prefix 133.41 and Source Port 8080, and corresponds to SR_ID 2. In the same fashion, the SR_ID 3 for the same MS 110 and the SR_ID 2 for the MS 110 with prefix 120.55 can be populated. The forwarding table entries remain as long as the corresponding SR_IDs are in use. When the SR_ID/GRE Key ID are released, in other words, the MS 110 determines that an auxiliary service instance is not to be used anymore; the PDSN 130 removes the entire entry from the forwarding table. This helps keep the forwarding table from growing to large proportions.

In FIG. 4, the MS 110 already has main service instance (SR_ID=1) in use. In one exception to Table 4, the MS 110 attempts to establish an auxiliary service instance, with a different SR_ID, such as in flow 423. However, the MS 110 derives the same SR_ID (for example, 1) with $f(x)$. The MS 110 increments the SR_ID by 1 and (SR_ID++) and uses it for the new auxiliary service instance.

However, when a second IP flow 431 arrives at the PDSN 130 from the host 150, the PDSN 130 also derives the main SR_ID number (for example, 1) based on header fields corresponding to the source address prefix, and so on. At this time, the PDSN 130 does not have any information based on which it can increment the SR_ID and map this flow to a different SR_ID. The MS 110 has incremented, but the PDSN 130 has not been notified of this. Therefore, the PDSN 130 will send the initial packet over the main service instance in flow 440.

If the flow is a bi-directional transaction, such as a conversational application, the MS 110 directs the reverse direction traffic over the auxiliary service instance. The MS 110 then notifies the PDSN 130 in flows 460 and 470 over the desired auxiliary service instance that the MS 110 received the packet over the wrong service instance, and that the employed auxiliary service instance is the correct service instance. Once the PDSN 130 is aware of which auxiliary service instances are in use by the MS 110, the PDSN 130 can increment to the next service instance. The PDSN 130 populates the forwarding table accordingly.

If the flow is a unidirectional type, such as a streaming media, the MS 110 (client) creates an RTSP (dummy) message and sends it over the desired auxiliary service instance to the host computer 145, 150 (server) through the PDSN 130. The header type can be a "require" type, which does not hamper the bearer. This indicates to the PDSN 130 that the selected auxiliary service instance is the correct service instance. An example of sending an RSTP dummy message over an auxiliary service instance appears below.

EXAMPLE

C->S: SETUP rtsp://server.com/foo/bar/baz.rm RTSP/1.0
   CSeq: 302
   Require: funky-feature
   Funky-Parameter: funkystuff
S->C: RTSP/1.0 551 Option not supported
   CSeq: 302
   Unsupported: funky-feature The MS 110 can also use an SIP message instead of RTSP. The semantics for SIP messages for this purpose will be very similar to RTSP. An example of sending a SIP dummy message over an auxiliary service instance appears below.

EXAMPLE

C->S: INVITE sip:Watson@bell-telephone.com SIP/2.0
   Require: com.example.billing
   Payment: sheep_skins, conch_shells
S->C: SIP/2.0 420 Bad Extension
   Unsupported: com.example.billing The PDSN 130 detects the packet header fields containing the RTSP/SIP messages and performs a similar function as described in the bi-directional case. The functions can be the same functions. The RTSP or the SIP message will be formed and initiated by the API in the MS 110 that is responsible for initiating the auxiliary service instance.

In a second exception to the above table, the MS 110 already has the main service instance setup (in other words, the service instance identifier, SR_ID,=1, the identifier of the main service instance) and the MS 110 has also successfully established a number of auxiliary service instances. The forwarding table in the PDSN 130 is therefore complete and the flows are being mapped based on the entries in the forwarding table. Now, a new flow arrives at the PDSN 130, flow 431, but the MS 110 did not open a new service instance. The PDSN 130 runs function $f(x)$ with the inputs from the header of the arrived packet and derives an SR_ID. There are two possibilities:

1. The SR_ID matches an existing forwarding table entry:
   a. If it matches an auxiliary service instance of SR_ID=X and that service instance is using LLA-ROHC (that is, compression), then the flow is sent over the main service instance.
   b. If it matches any other auxiliary service instance, then the PDSN sends the flow over that SR_ID. The PDSN 130 can also choose to send the packet over the main service instance.
2. The SR_ID does not match an existing forwarding table entry. The PDSN 130 sends the packet over the main service instance.

In both of the possible scenarios, the PDSN 130 does not create an entry in the forwarding table until it hears from the MS 110 in flows 460, 470. If the PDSN 130 does not hear from the MS 110 after sending a configurable number of packets over the service instance that it determines, the PDSN 130 can create a forwarding table entry for the new flow.

It is understood that the present invention can take many forms and embodiments. Accordingly, several variations can be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention can be employed without a corresponding use of the other features. Many such variations and modifications can be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for dynamically mapping a new Internet Packet (IP) flow to a service instance in a wireless telecommunications network, comprising the steps of:
   receiving at a Packet Data Serving Node (PDSN) a new Internet Packet (IP) flow from a mobile station (MS) defining a new service instance being started;
   establishing an entry in a forwarding table to identify the service instance to be associated with the new IP flow, the table configured to accommodate multiple service instances for the MS with differing quality of service (QoS) requirements;
   comparing data received from said new IP flow with data in the forwarding table to identify the service instance associated with the new IP flow; and
   sending the received packet from said new IP flow to the mobile station using the service instance associated therewith.

2. A method for dynamically mapping an IP flow to a service instance in a wireless telecommunications network with minimal signaling between a mobile station and a Packet Data Serving Node (PDSN), comprising the steps of:
   receiving at the PDSN a packet from an additional IP flow that had not previously been active with respect to the mobile station for which it is intended to be transmitted;
   calculating from header information in the received packet from said additional IP flow the service instance to be utilized for transmitting the packet to the mobile station and placing the service instance to be associated with the IP flow in a forwarding table; and
   transmitting the packet from said additional IP flow to the mobile station using the calculated service instance.

3. The method of claim 2, additionally including the following steps if the packet transmitted to the mobile station for said additional IP flow utilized a service instance different from the one expected by the mobile station:
   receiving at a Packet Data Serving Node (PDSN) information from a mobile station defining the service instance to be used for said additional IP flow; and
   establishing an entry in a forwarding table to identify the service instance to be associated with said additional IP flow.

4. A PDSN, comprising:
   a first port configured to receive a plurality of service instances for a mobile station (MS), the plurality of service instances having differing quality of service (QoS) requirements;
   a second port configured to connect to a data network; and
   an IP flow filter employable to map IP flows for the plurality of service instances, wherein each IP flow has its own unique QoS parameters, wherein the PDSN is further configured to receive an initialization and refresh packet, and wherein the initialization and refresh packet contains information employable to install the IP flow filter.

5. The PDSN of claim 4, wherein the data network comprises the Internet.

6. The PDSN of claim 4, wherein Reservation Protocol is employed by the PDSN to receive the IP flow filters by the PDSN.

7. The PDSN of claim 4, wherein the data network is coupled to a host computer.

8. The PDSN of claim 4, wherein the PDSN is configured to remove mapping indicia from RSVP message received from an MS.

9. The PDSN of claim 4, wherein the IP flow filter comprises a service instance identifier.

10. The PDSN of claim 4 wherein the IP flow filter comprises a source and destination IP address.

11. The PDSN of claim 4 wherein the IP flow filter comprises a source and destination port address.

12. A method of establishing mapping of IP flows to a plurality of instances in a PDSN, comprising:
   determining whether an auxiliary instance is to be employed, and if so, its quality of service (QoS) parameters;
   sending an IP filter object including information comprising indicia of the configuration of the auxiliary instance; and
   configuring a PDSN to map IP flows through employment of the IP filter object, wherein a plurality of IP flows to a mobile station (MS) are associated with a plurality of separate QoS parameters.

13. The method of claim 12, wherein the determining is performed by a mobile station.

14. The method of claim 12, wherein the sending is performed over a main service instance.

15. The method of claim 12, farther comprising discarding of the indicia of the configuration of the auxiliary instance upon completion of the configuration by the PDSN.

16. The method of claim 12, wherein the step of sending IP filter object further comprises sending indicia of selected QoS for a service instance.

17. A method of mapping a plurality of flows to a plurality of service instances, comprising:
   receiving a plurality of additional IP flows at a PDSN that had not been previously active with respect to a mobile station, wherein each IP flow has its own QoS characteristics;
   calculating from header information in the received plurality of additional IP flows a service instance to be utilized for transmitting the IP flows to a mobile station and placing the service instance to be associated with the IP flow in a forwarding table; and
   transmitting each IP flow on its corresponding service instance to a mobile station (MS).

18. A computer program product for mapping of IP flows to a plurality of instances in a PDSN, the computer program product having a medium with a computer program embodied thereon, the computer program comprising:
   computer code for receiving a plurality of additional IP flows at a PDSN that had not been previously active with respect to a mobile station, wherein each IP flow has its own QoS characteristics;
   computer code for calculating from header information in the received plurality of additional IP flows a service instance to be utilized for transmitting the IP flows to a mobile station and placing the service instance to be associated with the IP flow in a forwarding table; and
   computer code for transmitting each IP flow on its corresponding service instance to a mobile station (MS).

19. A computer program embedded in a computer readable medium for establishing mapping of IP flows to a plurality of instances in a PDSN comprising:

computer code for receiving a plurality of additional IP flows at a PDSN that had not been previously active with respect to a mobile station, wherein each IP flow has its own QoS characteristics;

computer code calculating from header information in the received plurality of additional IP flows a service instance to be utilized for transmitting the IP flows to a mobile station and placing the service instance to be associated with the IP flow in a forwarding table; and     computer code for transmitting each IP flow on its corresponding service instance to a mobile station (MS).

20. A system of establishing mapping of IP flows to a plurality of instances in a PDSN, comprising:

means for receiving a plurality of additional IP flows at a PDSN that had not been previously active with respect to a mobile station, wherein each IP flow has its own QoS characteristics;

means for calculating from header information in the received plurality of additional IP flows a service instance to be utilized for transmitting the IP flows to a mobile station and placing the service instance to be associated with the IP flow in a forwarding table; and     means for transmitting each IP flow on its corresponding service instance to a mobile station (MS).

* * * * *